United States Patent
Tateson

(10) Patent No.: US 8,027,810 B2
(45) Date of Patent: Sep. 27, 2011

(54) AD HOC SENSOR NETWORKS

(75) Inventor: Jane E Tateson, Woodbridge (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 356 days.

(21) Appl. No.: 10/585,890

(22) PCT Filed: Dec. 22, 2004

(86) PCT No.: PCT/GB2004/005409
§ 371 (c)(1),
(2), (4) Date: Jul. 12, 2006

(87) PCT Pub. No.: WO2005/071364
PCT Pub. Date: Aug. 4, 2005

(65) Prior Publication Data
US 2008/0221836 A1 Sep. 11, 2008

(30) Foreign Application Priority Data
Jan. 26, 2004 (GB) .................................. 0401629.1

(51) Int. Cl.
*G06F 11/00* (2006.01)
(52) U.S. Cl. ........ 702/189; 702/188; 455/434; 455/436; 455/437; 455/440; 455/512; 455/513; 455/514; 455/515; 455/522; 455/525
(58) Field of Classification Search .......... 702/188–189; 455/434, 436, 437, 440, 512–515, 522, 525
See application file for complete search history.

(56) References Cited

U.S. PATENT DOCUMENTS

| 4,663,628 | A | 5/1987 | Duncan et al. |
| 6,205,362 | B1 | 3/2001 | Eidson |
| 6,401,541 | B1 | 6/2002 | Kurtz |
| 2002/0147024 | A1* | 10/2002 | Wan .............................. 455/515 |
| 2002/0163912 | A1* | 11/2002 | Carlson ......................... 370/392 |

FOREIGN PATENT DOCUMENTS

EP 0019672 12/1980
(Continued)

OTHER PUBLICATIONS

Merriam-Webster Dictionary online, Definition of "similar".*
(Continued)

*Primary Examiner* — Sujoy Kundu
(74) *Attorney, Agent, or Firm* — Nixon & Vanderhye P.C.

(57) ABSTRACT

A plurality of mobile sensor devices each periodically measure a property of their environment, and determine the rate of change in that property. Neighboring devices also co-operate to determine the values of the property being measured by each other. If the property is invariant both over time and over a number of neighboring devices, their periodicity of measurement-taking is reduced to conserve power for more significant measurement events. The devices may co-operate to relay their measurements to a data collection point. Each device determines the level of data traffic being carried by one or more neighboring devices, identifies the device that is carrying the least traffic, and puts itself under the control of that device. Any device that determines that it is carrying less such traffic than any of its neighbor assumes control of the data sensing rate for itself and those neighbor, and transmits control data to the said other devices to co-ordinate their data collection rates and stagger their data collection times.

20 Claims, 4 Drawing Sheets

FOREIGN PATENT DOCUMENTS

| | | |
|---|---|---|
| EP | 0377913 A2 | 7/1990 |
| FR | 2792402 | 10/2000 |
| GB | 2383639 A | 7/2003 |
| GB | 0321096.0 | 9/2003 |
| WO | 2005/006668 | 1/2005 |
| WO | 2005/025147 | 3/2005 |

OTHER PUBLICATIONS

Cerpa, et al., "Habitat Monitoring: Application Driver for Wireless Communications Technology," ACM SIGCOMM Workshop on Data Communications in Latin America and the Caribbean, Costa Rica, pp. 20-41 (Apr. 2001).

Heinzelman, et al., "Energy-Efficient Communication Protocol for Wireless Microsensor Networks," Proceedings of the 33$^{rd}$ International Conference on System Sciences (HICSS '00), pp. 1-10 (Jan. 2000).

GB Search Report dated Apr. 30, 2004.

International Searh Report dated Apr. 25, 2005.

* cited by examiner

AD HOC SENSOR NETWORKS

This application is the US national phase of international application PCT/GB2004/005409 filed 22 Dec. 2004 which designated the U.S. and claims benefit of GB 0401629.1, dated 26 Jan. 2004, the entire content of which is hereby incorporated by reference.

BACKGROUND

1. Technical Field

This invention relates to sensor networks of the kind in which data is collected from a network of mobile sensor devices, each of which is capable of taking measurements and relaying packets of data. Such devices are used by scientists taking measurements of the behavior of the environment. Mobile sensors are of particular application in monitoring the movement of individual objects such as vehicles or animals, and of fluid flows such as air, water, ice, lava, etc. However, they also have uses in measuring other, non-movement related, phenomena, because the mobility of the sensors avoids the researcher having to place them by hand, or the need for a fixed or uniform architecture. The properties to be measured may include temperature, pressure, or the chemical composition of the medium in which the sensors are carried. In some applications, the sensors may be attached to vehicles or other objects capable of autonomous movement. For example they may be attached to animals in order to monitor their migratory behavior or physiological condition, or to aircraft to monitor atmospheric conditions.

2. Related Art

The environments in which such devices are required to operate often have measurement points widely dispersed in both space and time. Some of the environments are hostile to human life. In some applications, such as the study of animal behaviour, human intervention could compromise the data. For these reasons the devices must be capable of operating autonomously, and transmitting the data they collect to a more convenient point using a wireless medium such as radio or sonar. Moreover it is not usually possible to provide a continuous power supply, so the useful life of a device is primarily constrained by battery life. A particular area where advantage would be seen would be in the application of pollution monitoring in rivers and reservoirs, or in the atmosphere. Here, again, it would be inconvenient to have to fix sensor devices to river beds or reservoir basins, or at monitoring points such as weather stations: it would be far easier to use floating devices. Such devices may also allow measurements at points where there is no solid surface, without the provision of buoys, tethered balloons, masts etc.

The sensors are each supplied with a wireless transmitter to transmit readings to a data collection point. The medium of the wireless transmissions may be radio, ultrasound or any other suitable means, depending on the environment in which the sensors are to be used.

Memory and processor capacity, and energy usage, are particularly important in sensor networks. These typically consist of very small, very cheap microprocessors, e.g., 16 bit, with 32 kilobytes of RAM. They also have a finite battery supply, which would be impractical to replace given the nature of the applications in which the sensors are to be used. It is therefore, very important that any communication protocol is energy-efficient, and also pared to a minimum in communication overhead and memory usage. The present applicant has developed a number of processes to develop an "ad hoc" wireless transmission network, in which the sensors relay data from one to another. This reduces the transmission power required overall, because two or more short-range transmissions require less power than a single transmission over the same total distance to the data collection point. (This is a consequence of the "inverse square law" of radiation propagation.) To avoid exhaustion of individual devices, these processes take into account the amount of traffic handled by each sensor device, and its remaining battery life, in order to determine how much relay traffic each device should be required to handle.

International patent applications PCT/GB2004/001999 (published as WO 2005/006668) and PCT/GB2004/003510 (published as WO 2005/025147) discuss this work. The first of these discloses a system of mobile data wireless relay devices, each having receiving means for receiving payload data from a data source, a buffer for storing payload data for subsequent transmission, means for receiving status data from similar devices, status data generation means for generating status data, the status data being derived from the quantity of data in the buffer store and the status data received from other devices, and comprising data relating to the position of the device, the quantity of data in the buffer store a scalar forwarding value ($\delta$) and a forwarding direction, status transmitter means for transmitting status data to other devices selection means for identifying from the status data a receiving device to which the payload data is to be forwarded, the receiving device being located in a position indicated by the forwarding direction, payload transmission means for transmitting the payload data to the receiving device.

The other application discloses a system in which the data relay devices have receiving means for receiving payload data from a data source, a buffer for storing payload data for subsequent transmission, means for receiving status data from similar devices, status data generation means for generating status data, the status data being derived from the quantity of data in the buffer store and the status data received from other devices, and comprising data relating to the separation of the device from other devices, the quantity of data in the buffer store means for determining a scalar status value determined by the quantity of data stored in the buffer and its separation from nearby sensors, status transmitter means for transmitting the status value to other devices selection means for identifying, from the status data received from other devices, a receiving device having a status value which varies from its own status value in a manner indicative that payload data may be forwarded to it, and payload transmission means for transmitting the payload data to the identified receiving device.

The wireless relay devices therefore identify the neighbouring device giving the best chance for the payload data to ultimately get all the way back to a data collection point or "sink". It requires no explicit knowledge of the topology of the network, and in particular requires no details of any hop other than the one to which the device is directly connected.

These systems therefore allow the routing of data from sensor devices to higher-powered "sink" or "base-station"

devices, using sensor/relay sensor devices that may be mobile in unpredictable ways, of low power, small, cheap and simple, and yet able to convey data back to a central network point or points in an opportunistic way, without prior configuration. In these systems the sensor/relay devices each have some buffer data storage capacity, which can be used either for data it has collected itself, or for data relayed from other devices. They co-operate to determine whether an individual device should transmit data to another such device. This decision is based on the amount of spare data capacity in each device, the distance between them (and therefore the transmission power required), the battery life remaining, and their relative proximities to the intended ultimate destination of the data (a data "sink").

As has already been discussed, battery life is an important consideration in systems of this kind, as it would be impractical to locate or recover the devices in order to replenish their power supply when the batteries are exhausted. In addition to controlling the relaying of data between sensors as discussed in the patent specifications referred to above, it is desirable to find other ways to minimise power consumption in order to maximise the useful life of the devices. The present invention is concerned with improving the efficiency of the data collection process itself.

W B Heinzelman, A P Chandrakasan and H Balakrishnan, (Energy-Efficient Routing Protocols for Wireless Microsensor Networks, Proceedings of the 33rd International Conference on System Sciences (HICSS '00), January 2000) describe a process for routing data efficiently in sensor networks by exploiting distributed aggregation of data based on clustering techniques. Cluster heads are chosen in rotation to act as local aggregators and relays of data back to the central network point(s) (sink/base-station). Such aggregation of data can reduce communication load, and rotation of the heavy-duty function of relaying the data over long distances ensures that no one device is exhausted prematurely. However, there is a cost associated with maintaining these clusters and negotiating the next cluster head, which is viable for stationary sensor devices, but offers diminishing return as sensor devices become mobile.

This prior art arrangement is designed to maximise the data collected. However, in many situations, the contributions of individual items of data to the whole are not equal. A typical use of such sensors is for the detection of the time or location of a significant phenomenon within a much larger region of space and/or time monitored by the sensor network. For example, they may be used to detect the presence and dispersion of pollution in water. In such a situation, in order to provide useful data, the data points have to be spaced closely enough, in both space and time, to detect the phenomenon being measured. However, in many cases this results in the collection of a large amount of redundant data, collected in regions or at times when the phenomenon is not present, or has a constant value. This is because the distribution of the sensors is more or less random, and the time and location of the phenomenon is not knowable in advance. It is desirable to optimise the roles of sensing and routing in order to gather as much significant information from the sensor network as possible, within the constraints of the limited processing and communications capability, and the unpredictable movement of the sensors, which limit the amount of co-operation possible between the devices.

Work by A. Cerpa, J. Elson, D. Estrin, L. Girod, M. Hamilton and J. Zhao, refers to habitat monitoring as a driver for wireless communications technology, and focuses on power-saving by having devices switching themselves on and off according to whether they are in the vicinity of regions where interesting activity is expected, or detected by other devices. ("Habitat Monitoring: Application Driver for Wireless Communications Technology", ACM SIGCOMM Workshop on Data Communications in Latin America and the Caribbean, Costa Rica, April 2001.) However, this process requires foreknowledge of where such activity is likely to take place,

BRIEF SUMMARY

The present exemplary embodiment provides a sensor device having means for periodically measuring a property, generating a measured value of the property, and storing the measured value, comprising means for determining the rate of change in the measured property and means for determining the values of the property being measured by similar devices, and means for adjusting the periodicity of measurement according to these values. Preferably the device should sense more frequently when the phenomenon of interest is changing more. This may be determined by calculating the standard deviation of a predetermined number of preceding readings. The device may sense less frequently when a sensor device's neighbors are taking the same readings. Sensor devices according to the invention may determine the values being measured by neighboring devices by the provision on each such device of a transmitter to broadcast the measurements being taken by the device and a receiver to receive such broadcasts from similar devices.

In a preferred embodiment, the device also has provision for exchanging data with neighbouring devices for the purpose of relaying it to a data collection point, the data generated by the device or received from others being stored in a buffer until it can be transmitted. In such an arrangement, the means for adjusting the periodicity of measurement may also be made responsive to the level of such traffic being handled by the device. This may be determined according to the amount of data awaiting transmission.

The routing protocols discussed in the prior art system preferentially route data to devices with relatively empty buffers. Using such a routing protocol in conjunction with the present invention would ensure that devices that are taking a lot of readings will be sent fewer packets to forward, as their buffers are occupied with the packets they are generating themselves. In this way, the load on sensor devices is more evenly distributed. At any given time some sensor devices are mainly sensing, and other sensor devices are mainly relaying data generated elsewhere, but these roles will vary in time. This partitioning of role leads to load balancing, enabling sensor devices to have longer operational lives than they would otherwise. The devices also concentrate on taking interesting measurements, so that the overall effect is that the network gathers a greater quantity of information about the phenomenon of interest.

A network of such devices would optimise the use of scarce sensor resources by trading off sensing load against routing load and processing load, in a distributed, opportunistic way, where the rate of sensing responds to changes in magnitude or position of a measurable phenomenon. The invention allows the coupling of opportunistic routing load with sensing load, and makes sensing respond preferentially to significant changes. This allows more significant information to be obtained with very little memory or processing power required for each individual device, and very little network planning.

This co-operative operation allows devices that are for the moment in the same sensing environment to be identified, so that they can share the workload for a time, until something changes. However, the nodes are not dependent on each other for any other purpose, and collect data and relay it to the data collection point as in the prior art system. A device moving from one co-operating group, or "cluster", to another may change its sensing interval, or its phase in response to the new group in which it finds itself. The group of which it previously formed a part is capable of operating in the same way whether that device is still behaving as part of that group or some other group.

BRIEF DESCRIPTION OF THE DRAWINGS

A detailed exemplary embodiment according to the invention will now be described by way of example, with reference to the Figures, in which.

DETAILED DESCRIPTION OF EXEMPLARY EMBODIMENTS

Figure 1:
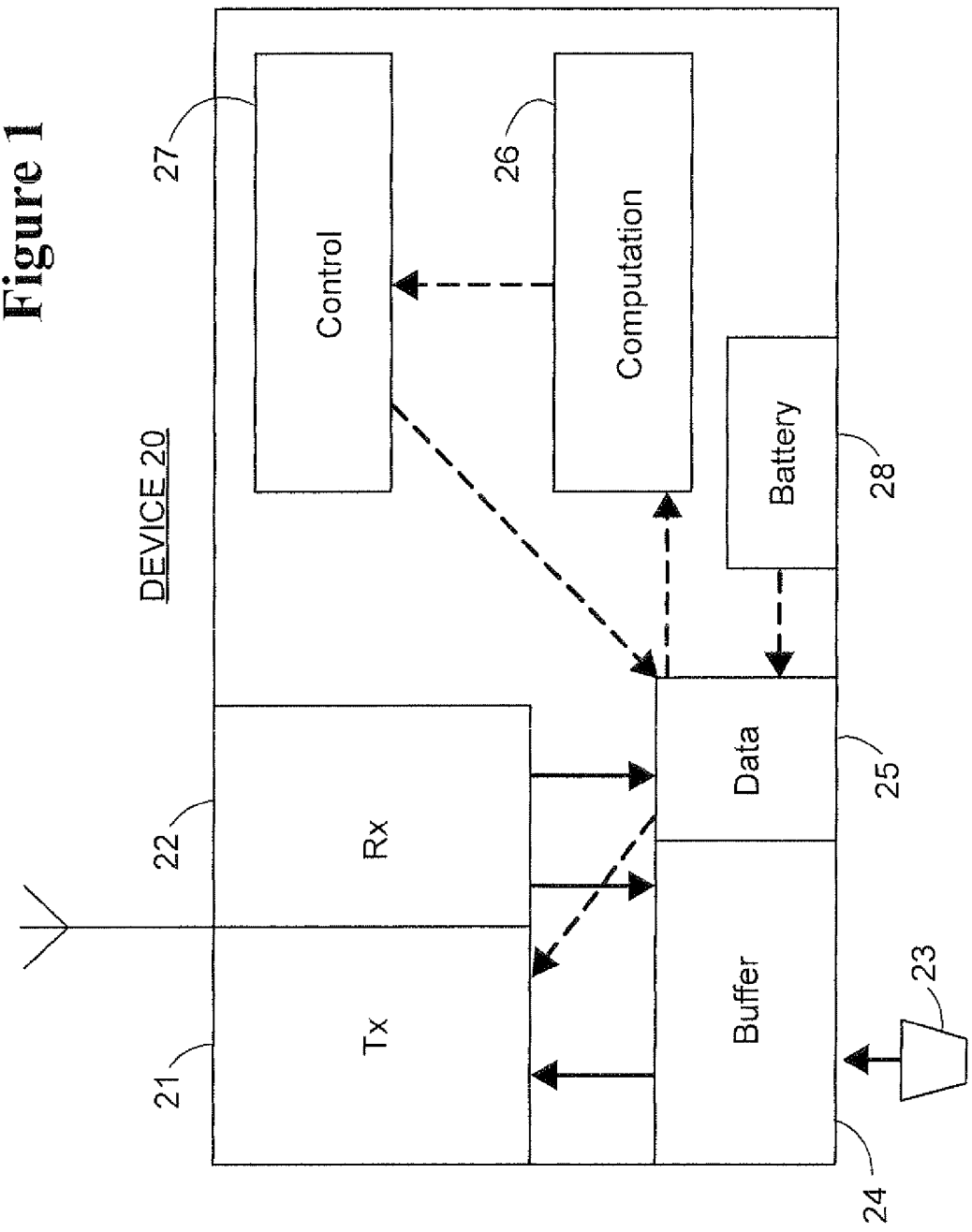
FIG. 1 is a schematic diagram of a sensor device according to the invention.

FIG. 1 shows a device 20 according to the invention, It comprises a wireless transmitter 21 and a wireless receiver 22, and data collection means 23 which include position sensors, and environmental or physiological sensors for determining properties of the environment of the device, or of some object to which it is attached. There is also a data buffer 24 for storing payload data (that is to say, data that is to be transmitted to a destination for processing) and a data store 25 for operational data (that is to say, data required for the operation of the device and in particular for controlling the transmission of the payload data). There is also computation means 26 for processing the data collected by the data collection means 23 and stored in the data buffer 24, and control means 27 for controlling the operation of the device in response to outputs from the computation means 26. The device is powered by a battery 28 whose condition is monitored and the results stored in the data store 25 with other operating parameters. (The power connections themselves are not depicted in this schematic diagram.)

Figure 2:
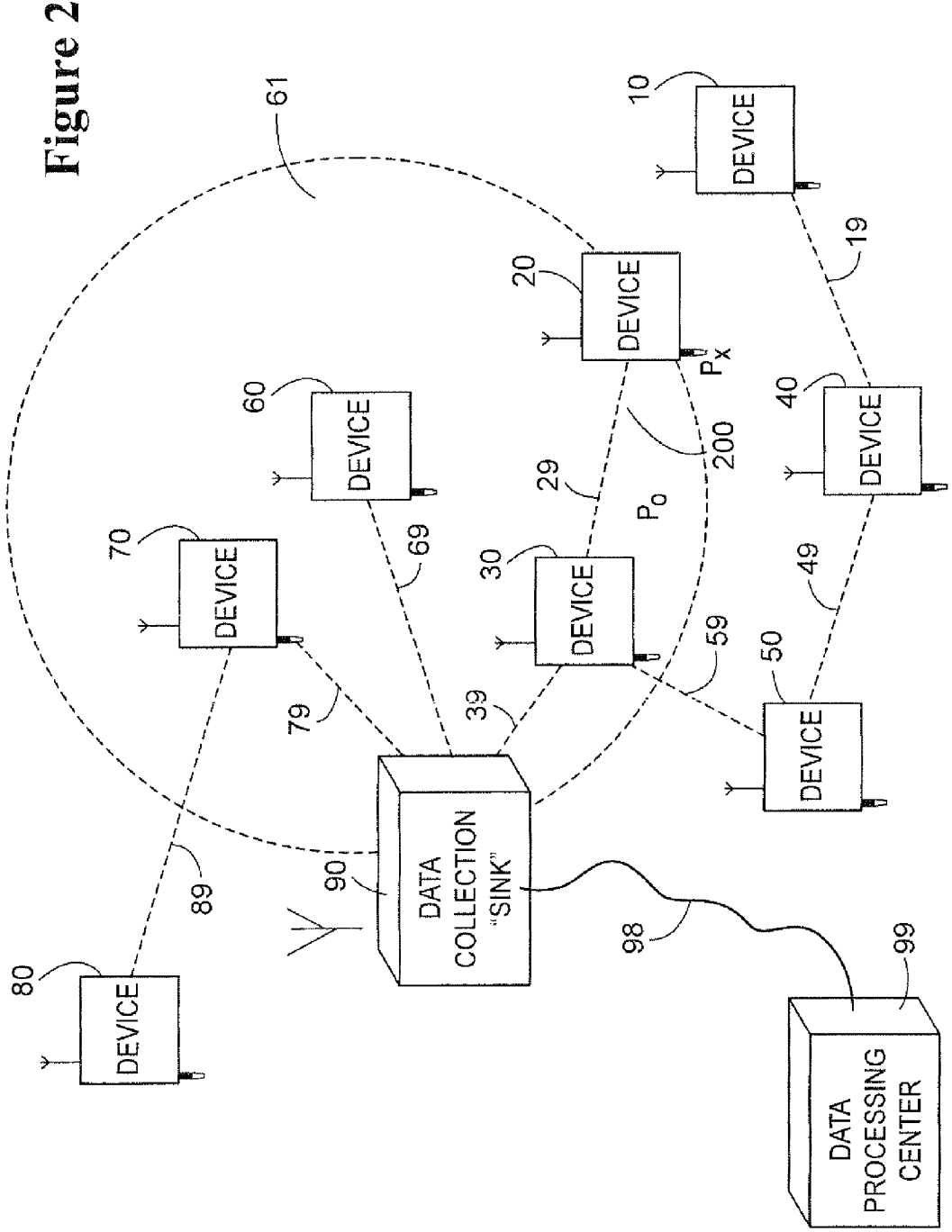
FIG. 2 is a schematic diagram of an ad hoc network made up of devices of the kind shown in FIG. 1.

FIG. 2 shows a network comprising several devices 10, 20, 30, 40, 50, 60, 70, 80, each of the type shown in FIG. 1. These devices are free to move relative to each other through their environment, collecting data from their environment such as temperature, barometric pressure, salinity etc). This network of sensors is low-cost and can hence be haphazardly distributed in previously difficult to monitor areas. They may be carried by inanimate forces such as ocean or air currents, lava or glacier flows, or they may be attached to animals or human beings to monitor their movements or physiology, or to a vehicle to monitor its progress on a journey or to locate it if it is reported to have been stolen.

The devices 10, 20, 30, 40 etc shown in FIG. 2 form an ad hoc wireless network 19, 29, 39, 49, etc. The wireless connections may use radio, sonar or any other transmission medium suitable for the environment in which the devices are expected to operate. Data collected by a device 20 (either by its own sensors 23, or relayed from another device 10) is transmitted to a destination 90 either directly or by means of one or more other devices 30. The destination 90 is a fixed receiver station, which will be referred to as an information "sink", and which collects data collected by the mobile terminals 10, 20, 30 etc for subsequent processing. There may be more than one sink in the network. The sink device 90 is more powerful than the sensor devices 10, 20 30 etc, both in terms of processing capability and power-consumption, and either have long-term storage facilities for the data, or a long-range transmission link 98 to a data-processing centre 99. The sensor devices 10, 20, 30 themselves have very limited battery power (allowing only short-range wireless transmissions), small processors and limited memory. In operation, each device is allocated a status value which is determined in accordance with the amount of data in its buffer store, the remaining battery life and the positions of neighbouring devices, data being forwarded from one device to another if the difference in status value exceeds a threshold. Data is only transmitted if this criterion is met, resulting in an efficient use of the devices as relays by minimising the transmission power required and avoiding congestion of any individual buffers. Suitable systems are discussed in the applicant's earlier applications referred to above.

Figure 3:
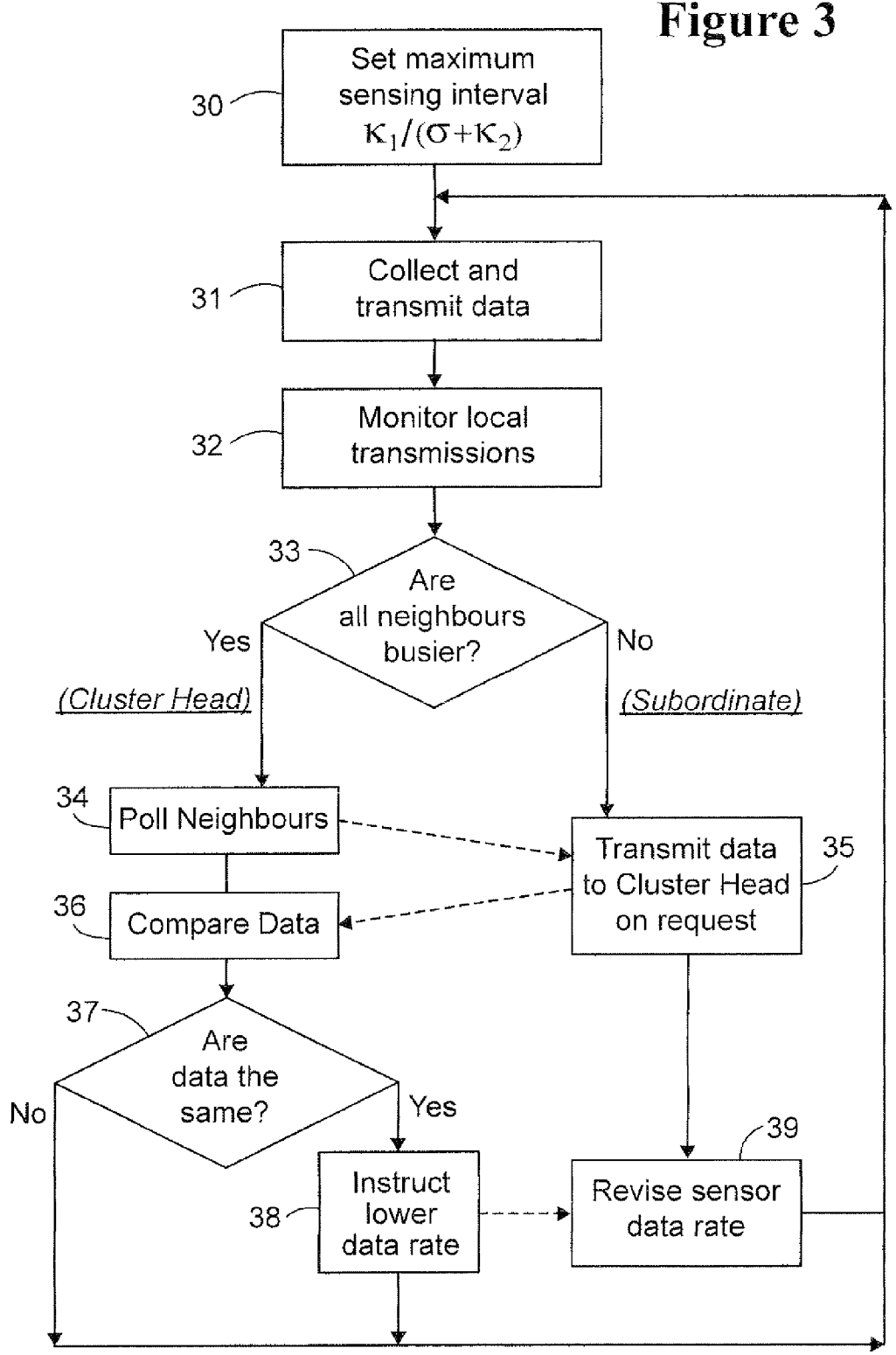
FIG. 3 is a flow diagram illustrating the operation of the device of FIG. 1.

The present invention allows further efficiencies to be achieved by controlling the operation of the sensors themselves, as will now be discussed with reference to FIG. 3.

Each sensor device has three modes of operation, referred to herein as autonomous, cluster head, and subordinate. The autonomous mode is the default mode. The device first sets itself a "maximum sensing interval" (maxsensint) (step 30). This is determined according to the rate at which readings have been changing, according to a parameter $$\text{Maxsensint} = \kappa_1/(\sigma + \kappa_2)$$

where $\sigma$ is the standard deviation of a predetermined number of previous readings, (e.g. the last 5 or 10 readings) and $\kappa_1$ and $\kappa_2$ are constants. The constant $\kappa_2$ prevents the denominator of the expression having a value of zero, and the constant $\kappa_1$ determines the sensitivity of the sensing interval to the standard deviation of recent readings. Note that if the last few readings have all been identical, the standard deviation is zero and the expression reduces to $\kappa_1/\kappa_2$, which is set to the maximum time the device may remain dormant. This value may itself vary, for example a pollution monitor may be set to take a minimum of one reading a day, but if that reading exceeds a threshold, it may change to a different mode in which the device powers up to take a reading more frequently.

The devices then collect data at the rate so determined (step 31). This data then has to be transmitted to a collection point 90 (FIG. 2)

Note that the value maxsensint is a current maximum interval. If the readings taken by the sensor change, the value of maxsensint falls and so the rate at which readings are taken increases. However, if the readings then settle down to a constant value, so that the value of the standard deviation falls, the device will continue to take readings at the rate previously set, since the interval between them is already less than the new maximum. The device will only reduce the sensing rate if it changes from the default mode, as will now be described.

As the sensor devices are mobile, changes in the sensed value may be due to the value of the measured phenomenon changing, or the movement of the phenomenon, or the movement of the sensor device. The first two cases will always result in interesting information, as long as the responsiveness of the sensing interval has been sensibly calibrated. These situations are addressed by the changes in the value of maxsensint as already discussed. However, the movement of the sensor device may or may not yield interesting information. For example, other sensor devices may be moving in a concerted way across the region of the phenomenon of interest, resulting in a lot of duplicated information. More commonly, it might be the case that neighbouring sensor devices are (for the time being) consistently reporting the same value of a phenomenon.

In order to avoid unnecessary duplication of data, and the consequent signalling overhead to collect such redundant data, the sensor devices organise themselves into clusters. Note that this is quite independent of the process by which the data is transmitted to the data collection point 19. Indeed, a device that is busy with relay traffic is likely to be less suited as a cluster head.

In order to identify devices that are to act as cluster heads, and thereby control the data collection process performed by other nearby devices, each device 10, 20, 30, 40, 50, 60, 70, 80, 90 monitors the neighbouring devices (step 32) to identify the amount of radio traffic they are each carrying. The radio traffic includes the traffic generated by each device itself, and also any traffic generated elsewhere and being relayed through that device. If a device 60 identifies itself as being less busy than any of its neighbours 20, 30, 70, 90 it starts to operate as a cluster head (steps 34, 36, 37, 38). Devices 20, 30, 70, 90 that do not appoint themselves as cluster heads act as subordinate devices and await instructions (steps 35, 39) from a cluster head.

A subordinate device continues in the default autonomous mode until it receives instructions from a cluster head.

Note that the decision to become a cluster head is made by a sensor device purely on the basis of the traffic it monitors. The other devices do not need to agree to this. It is possible that two devices 50, 60, out of range of each other, have both assumed the role of cluster head, and have both identified the same subordinate device 30 as being part of their own clusters. The subordinate device 30 can respond to either, or both, of these nearby 'cluster heads' 50, 60 according to the order in which it receives messages. Ideally it should respond to the most up to date information available as the behaviours and roles of the nodes are constantly changing. However, in order to limit messaging overhead, the devices may be configured such that once a sensing interval has been set, it cannot be altered within a predetermined time interval (or number of sensing intervals) has elapsed, which will be some function of the experiment lifetime, battery lifetime and messaging cost. If the offer of joining a new clustering scheme should occur within this time then it is ignored.

If a first device 40 identifies a second device 20 as being less busy, but that second device identifies a third device 60, out of range of the first device 40, as being even less busy, the first and second devices 40, 20 will both operate as subordinate devices, but only the second device 20 will receive any instructions. In the absence of any instructions from a cluster head, the device 40 will continue to operate autonomously, collecting data at whatever rate was previously set.

The cluster head device 60 next broadcasts a signal to each device 20, 30, 70, 90 in its cluster 61 (step 34) requesting them to send their rolling average sensed values, and their current sensed value. Each subordinate device receiving such an instruction from its cluster head 60 transmits the data requested back to the cluster head (step 35).

The cluster head 60 then compares the values submitted by each subordinate device, and the value currently measured by the cluster head itself, (step 36). If all these values are within a predetermined tolerance limit the devices are assumed to be taking equivalent readings and therefore generating redundant information (step 37). All the devices 20, 30, 60, 70, 90, including the cluster head itself, are then instructed by the cluster head to take sensor readings less frequently (step 38), and to stagger the times of those readings. The reduction in the sensing rate is determined by the number of devices responding to the cluster head.

On receiving their instructions, the cluster head and subordinate devices each respond by adjusting the sensing interval, (subject to their absolute maximum interval $\kappa_1/\kappa_2$) and phasing.

Consequently, when a set of nodes is in a region where the values of their measurements are only changing slowly, or not at all, they will all converge to taking measurements at the rate of maxsensint, which will itself have converged to one value. There will be small-scale phase co-ordination amongst nearest neighbours, but it is not essential for measurements to be evenly spread in time throughout the whole experimental area. If at any time nearby nodes are taking measurements at different rates, then the phasing will not work exactly, but in a steady state, providing that the devices are truly in the same sensing environment, they will all converge on the same value of maxsensint, whereupon the phasing will work.

In this way the data collection load can be shared whilst still gathering the same or almost the same amount of information.

The value of constant $\kappa_1$, and therefore of maxsensint may be varied for different alert states, depending on observations of out-of-the ordinary measurements for the network as a whole. Such an alert status could be transmitted with the data messages. If the rate of change of the measured property falls (in other words the phenomenon locally approaches a steady state) or the sensor moves away from the changing phenomenon, then the maximum sensor interval maxsensint would increase. However, the sensor would continue to take frequent measurements until it enters a cluster that allows the sensing interval to be lengthened, up to the current value for maxsensint. This approach means that a sensor moving close to the edge of a region of great interest will continue to take frequent measurements, marking the boundary of the changing phenomenon, but when the sensor's current and average readings become the same as those of one or more nearby devices, then short-term clustering takes place—those devices can share the sensing work by taking out-of-phase measurements at intervals of less than the lowest common value of maxsensint). If the device does not go back into the region in which the phenomenon is changing rapidly, its sensing interval will remain at this lowest common value of maxsensint.

If the device moves far from the region in which the phenomenon is changing, then it may end up in a cluster in which the sensing interval is equal to maxsensint=$\kappa_1/\kappa_2$ i.e. where the standard deviation of its last few measurements is zero. Consequently network resources can be conserved by avoiding uninteresting readings, and—by use of opportunistic routing—the devices taking infrequent readings will have emptier buffers, and will therefore tend to do more relaying work, leaving the sensor devices close to the phenomenon of interest to focus on gathering and forwarding their own more interesting measurements.

Figure 4:
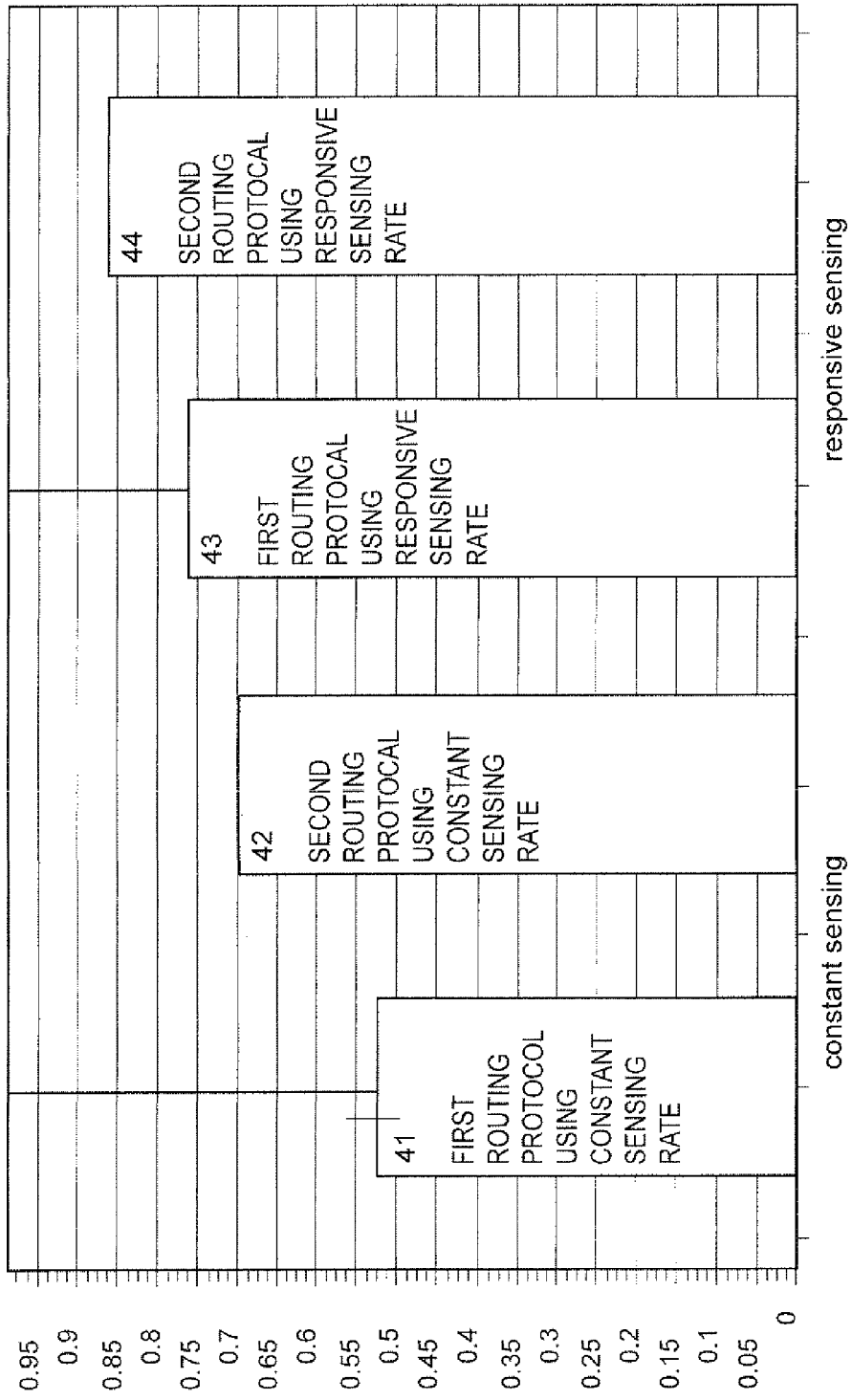
FIG. 4 is a diagram comparing the results of simulations of the use of such devices with simulations using a conventional data-gathering process.

Simulations were carried out in order to test these ideas, and the results are shown in FIG. 4. The scenario is one in which there are forty-eight highly mobile sensor devices and two network sinks to which data is to be conveyed. The sensor devices are wireless, and do not have sufficient memory or processing power to carry out conventional ad hoc routing such as AODV, but exploit one of the opportunistic routing methods already discussed. The scenario can be envisaged as an application to monitor pollution in water, with the devices floating about in an undetermined way in water.

In the simulation, a source of pollution is generating a gradient of pollution measurement with a circular shape. The focus of the simulation is to determine how well this circular area of pollution can be characterised by data collected by the network in a finite time, with finite resources of buffer memory and battery energy. During such an experiment, a minority of the sensor devices will use up all their battery energy and become useless in terms of taking measurements and relaying data. The 'perfect' result that a network could achieve is reporting data on 100% of the area in which there is pollution. The success of the data gathering does not refer to the quantity of data packets arriving at the sinks/base-stations, but on the proportion of the area of polluted water for which data has been received. Results quoted are each averages of ten simulations, for which the size and position of the pollution area varies, as do the positions of the fixed sinks/base-stations, and the motions of the forty-eight mobile sensor devices. Initially two routing protocols were used, one (represented in the results 41,43) corresponds to the routing protocol discussed in the patent application GB0321096.0 (serving as priority application for WO 05/025147), and the other routing protocol (results 42,44) is a variant of it. Each routing protocol is used with a constant sensing rate (41,42) and a responsive sensing rate according to the invention (43, 44). As explained above, the measure of success is the proportion of polluted water area that is characterised by the end of the data-gathering experiment, which is given as a fraction on the left hand axis, with 0.95 meaning 95%. The results are tabulated below, and represented graphically in FIG. 4.

|  | Constant Sensing | Responsive Sensing |
| --- | --- | --- |
| Routing Protocol 1 | 51.8% | 76.4% |
| Modified Routing Protocol | 69.9% | 86.6% |

It is clear from these results that enabling the sensor devices to vary their sensing rates according to the standard deviation of measured values, coupled with regard to sensing behaviour of neighbouring sensors, results in a much greater proportion of 'polluted' area being characterised by data measurements collected at the sinks/base-stations. This is because a consistent sensing rate (41,42) means that either a lot of data traffic is generated which has no relevance to the centre of pollution, and/or that insufficiently frequent readings are taken by sensor devices close to the pollution centre.

The invention therefore provides a simple mechanism whereby sensing can be concentrated on the region of interest, without any restrictions being placed on the movements of sensor devices. Whilst the invention is of particular application in situations where battery life is critical, there may be applications where this is less of an issue, for example where sensors are mounted on vehicles with their own power supplies. However, the reduction in redundant data offered by the invention would still have benefits in such situations in reduced processing time and memory capacity.

What is claimed is:

1. A sensor device comprising:
    means for periodically generating a measured value of a property;
    means for determining the rate of change in the measured property;
    means for determining the values of the property being measured by devices similar to said sensor device; and
    means for adjusting the periodicity of measurement according to the values the sensor device has measured and the measured values received from the devices similar to said sensor device.

2. A sensor device according to claim 1, further comprising:
    means for increasing the frequency with which measurements are taken when the property being measured is changing.

3. A sensor device according to claim 2, further comprising:
    means for calculating the standard deviation of a predetermined number of preceding readings.

4. A sensor device according to claim 1, wherein:
    the means for determining the values being measured by the devices similar to said sensor device determines the values being measured by spatially neighboring devices, and
    the means for adjusting controls the device to reduce the frequency at which measurements are taken if neighboring devices are obtaining the same values for the measurements.

5. A sensor device according to claim 4, wherein the means for determining comprises a transmitter to broadcast the measurements being taken by the device and a receiver to receive such broadcasts from the devices similar to said sensor device.

6. A sensor device according to claim 5, wherein said means for determining comprises means for exchanging data with neighboring devices for the purpose of relaying it to a data collection point, the data generated by the device or received from others being stored in a buffer until it can be transmitted.

7. A sensor device according to claim 5, the means for adjusting the periodicity of measurement being responsive to the level of such traffic being handled by the device.

8. A sensor device according to claim 6, further comprising:
    means for determining the level of data traffic being carried by one or more neighboring devices,
    means for comparing the traffic levels carried by the neighboring devices with traffic it is itself carrying,
    means for transmitting control data to other devices if it is carrying less traffic than the other devices, and
    means for receiving such control data from devices identified as carrying less traffic than it is,
    the control data having the effect of adjusting the times at which the measurements are taken by the device receiving the control data.

9. A sensor device according to claim 8, wherein the control data generated by the transmitting device controls the receiving device to reduce its data measurement rate.

10. A method of operating a plurality of sensor devices, said method comprising:
    periodically measuring a property at each of plural sensor devices,
    determining the rate of change at each device in the measured property,
    transmitting the values of the property being measured by each device from each device to one or more other devices, and
    adjusting the periodicity of measurement of each device according to the values it has measured and the values it has received from the one or more other devices.

11. A method according to claim 10, wherein the frequency with which measurements are taken is increased when the property being measured is changing.

12. A method according to claim 11, wherein the change in the property being measured is determined by calculation of the standard deviation of a predetermined number of preceding readings.

13. A method according to claim 10, wherein a group of neighboring devices exchange measurement data, and reduce the frequency at which measurements are taken if they are obtaining the same values for the measurements.

14. A method according to claim 13, wherein neighboring devices exchange data for the purpose of relaying it to a data collection point.

15. A method according to claim 14, the periodicity of measurement being responsive to the level of such traffic being handled by the device.

16. A method according to claim 13, wherein:
   each device determines the level of data traffic being carried by one or more neighboring devices, identifies the device that is carrying the least traffic, and puts itself under the control of that device, and
   a device that determines that it is carrying less such traffic than any of its neighbors assumes control of the data sensing rate for itself and those neighbors, and transmits control data to the said other devices.

17. A method according to claim 16, wherein the controlling device determines the measurements being made by all the devices under its control, and transmits control data to cause them to reduce their data measurement rates if those measurements are substantially the same.

18. A method according to claim 16, wherein the controlling device causes the devices under its control to stagger the times at which they take measurements.

19. A sensor device according to claim 1, wherein each of the sensor device and the devices similar to said sensor device is a mobile device.

20. A method according to claim 10, wherein each of the plurality of sensor devices is a mobile device.

* * * * *